(No Model.)
E. A. COCHRAN.
SHEARS OPERATING MECHANISM.
No. 523,266. Patented July 17, 1894.
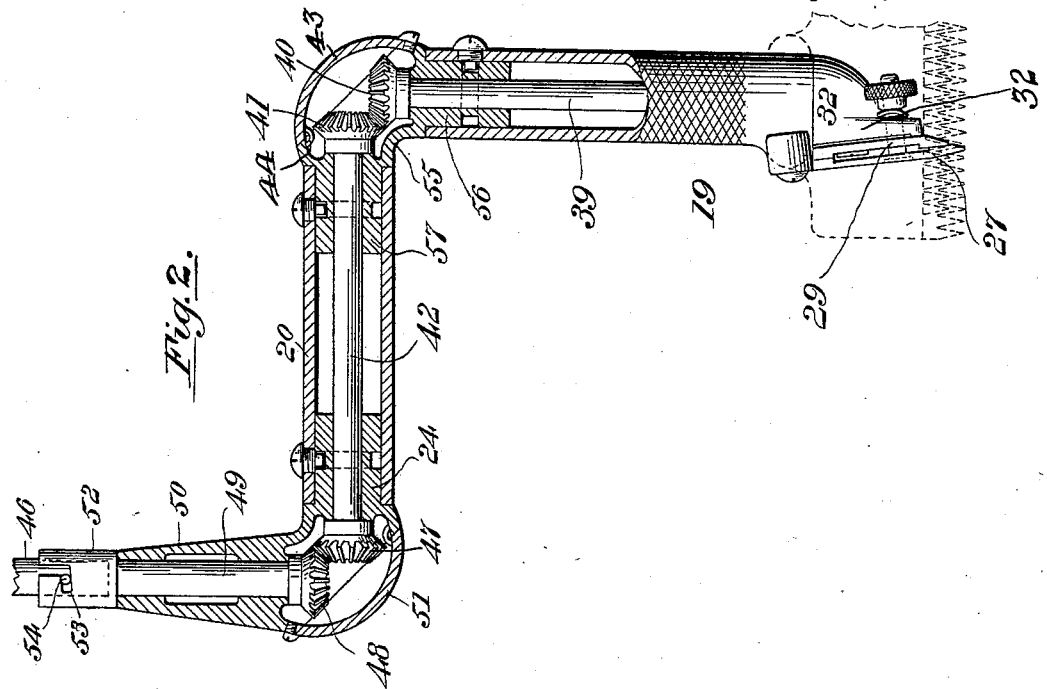
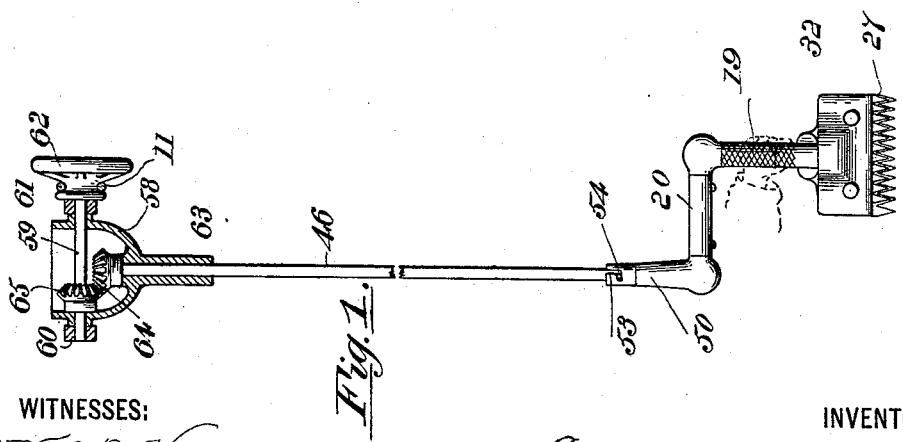
WITNESSES:
M. B. Harris
Henry Rein
INVENTOR
Edward A. Cochran
BY
Henry F. Parker
ATTORNEY

UNITED STATES PATENT OFFICE.

EDWARD A. COCHRAN, OF BROOKLYN, NEW YORK.

SHEARS-OPERATING MECHANISM.

SPECIFICATION forming part of Letters Patent No. 523,266, dated July 17, 1894.

Application filed May 29, 1893. Serial No. 475,813. (No model.)

*To all whom it may concern:*

Be it known that I, EDWARD A. COCHRAN, of Brooklyn, county of Kings, and State of New York, have invented a new and useful Improvement in Shear-Operating Mechanism, of which the following is a specification.

This invention relates to driving mechanism for operating horse-clipping or other implements designed to be moved into various positions upon different parts of the work; and the object of said invention is to obviate the friction incident to the use of flexible shafting such as usually employed; and the said invention consists in a universally movable system of arms and mechanism for transmitting rotative motion from the driving source to the tool, wherein certain novel features are embodied as hereinafter described and claimed.

In the accompanying drawings, Figure 1 is an elevation partly in section, showing my improved mechanism. Fig. 2, is a section on an enlarged scale showing a portion of said mechanism.

Similar characters of reference indicate like parts in both figures of the drawings.

Referring to the drawings, 19 and 20 designate tubular arms which carry the clipper mechanism and which are so arranged as to have a rotary movement at an angle to the other.

The clipper, provided with a comb plate 27, a reciprocating cutter plate 29, and a cover 32, is mounted in a suitable manner on one end of the arm 19, and the opposite end of said arm engages around a tubular bearing block 56 in such a way as to allow a free rotary movement of the arm relatively to the block. The block 56 forms a part of an elbow 55 which also has a bearing block 57, to which the arm 20 is attached but in such a manner that it like the arm 19, is free to rotate in relation to the block. The arm 20, engages at its other end around a bearing block 24, in a way to permit its free rotation relatively to the block, the said block 24 having attached to it a tubular arm 50, provided with bearings for part of the operating mechanism, as will appear hereinafter.

The construction just described allows a free movement of the arms one relatively to the supporting staff or shaft, so that the instrument operated has a universal range of movement. Each arm has a sufficient length to form a hand hold for guiding a tool.

I will now describe the means for operating the cutting mechanism.

The cutter plate 29, receives its reciprocating motion from a shaft 39. The shaft 39, is provided with a bevel gear 40, and the bevel gear 41, on a shaft 42, having bearings in the end of the arm 20, and in block 24. It will be seen that the comb plate 27, is so secured to the arm 19, that said comb plate and the cutter plate stand at an angle relatively to the longitudinal axis of the shaft 39.

To permit a free access to the bevel gears 40, 41 I provide the elbow 55, with a boxing having an outward opening provided with a removable cover 43. This cover 43 has on its inner side a lug 44, adapted to engage beneath a portion of the elbow 55, and a latch or button, on the said elbow may be turned to engage over a portion of the cover 43. It will be seen that the arms 19, 20, are at all times at an angle to each other, as are also the shafts 39, 42.

The motion is imparted to my device by means of a shaft 46, which is a portion of the supporting staff. The shaft 42, has a bevel gear 47, meshing with a bevel gear 48, on a short shaft 49, having bearings in the tubular arm 50 heretofore mentioned. A cover 51, is provided for the boxing containing the gears 47, 48, similar to the cover 43, before described.

I provide means for removably connecting the shaft 49, to the shaft 46. The means here shown consists of a socket 52, secured to the outer end of the shaft 49, and provided with a bayonet slot 53, within which a pin 54, on the shaft 46, engages.

58, shows a boxing mounted on the shaft 59, having bearings in a yoke 60, on a suitable supporting staff. This shaft 59, is rotated by means of the band 11, engaging with a pulley 61, on the shaft. A balance wheel 62, is attached to the pulley 61.

The shaft 46, extends through a sleeve 63, of the boxing 58, and is provided at its end with a bevel gear 64, meshing with a bevel gear 65, rigidly mounted on the shaft 59.

Having described the invention, what I claim is—

1. In an animal shearing apparatus, the combination of a suitable supporting staff, an elongated hand hold sleeve 20, at a permanent angle thereto, but independently rotative upon its own axis, a second elongated hand hold sleeve 19, at a permanent angle to the sleeve 20, also independently rotative upon its own axis, a suitable shearing device at the extremity of the sleeve 20, and means for imparting motion from the said staff through the said sleeves irrespective of their positions, to operate the shearing device.

2. The combination with a clipper, of the operating shafts therefor arranged at an angle to each other, a short shaft having a gear connection with one of said first named shafts and provided with a socket, having a bayonet slot formed in it, a supporting staff, and a rotary extension of said staff having its end seated in the socket of the short shaft and provided with a pin to engage in the bayonet slot of said socket, substantially as specified.

In testimony whereof I have hereunto set my hand this 23d day of January, 1893.

EDWARD A. COCHRAN.

Witnesses:
K. D. VAN PELT,
CLARENCE R. FERGUSON.